United States Patent
Wang

(10) Patent No.: US 12,238,554 B2
(45) Date of Patent: Feb. 25, 2025

(54) PHYSICAL DOWNLINK CONTROL CHANNEL DETECTION METHOD AND TRANSMISSION METHOD, USER EQUIPMENT AND BASE STATION

(71) Applicant: DATANG MOBILE COMMUNICATIONS EQUIPMENT CO., LTD., Beijing (CN)

(72) Inventor: Lei Wang, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 366 days.

(21) Appl. No.: 17/796,840

(22) PCT Filed: Feb. 20, 2021

(86) PCT No.: PCT/CN2021/077042
§ 371 (c)(1),
(2) Date: Aug. 1, 2022

(87) PCT Pub. No.: WO2021/164762
PCT Pub. Date: Aug. 26, 2021

(65) Prior Publication Data
US 2023/0057472 A1    Feb. 23, 2023

(30) Foreign Application Priority Data
Feb. 21, 2020    (CN) .......................... 202010107811.7

(51) Int. Cl.
*H04W 72/04*    (2023.01)
*H04W 24/08*    (2009.01)
(Continued)

(52) U.S. Cl.
CPC ....... *H04W 24/08* (2013.01); *H04W 72/0446* (2013.01); *H04W 72/23* (2023.01); *H04W 76/20* (2018.02)

(58) Field of Classification Search
None
See application file for complete search history.

(56) References Cited

U.S. PATENT DOCUMENTS

| | | |
|---|---|---|
| 2019/0123992 A1 | 4/2019 | Ly et al. |
| 2019/0268883 A1* | 8/2019 | Zhang .................. H04L 5/0094 |

(Continued)

FOREIGN PATENT DOCUMENTS

| | | |
|---|---|---|
| CN | 108632007 A | 10/2018 |
| CN | 109413754 A | 3/2019 |

(Continued)

OTHER PUBLICATIONS

Extended European Search Report for the corresponding European Patent Application No. 21756588.6 issued by the European Patent Office on Oct. 31, 2023.
"Other considerations on UE power saving" 3GPP TSG RAN WG1 Meeting #99, R1-1911874, Reno, USA, Nov. 18-22, 2019, Agenda Item: 7.2.9.4, Source: Huaweu HiSilicon, all pages.
International Search Report for PCT/CN2021/077042 issued on May 19, 2019, and its English Translation provided by WIPO.
Written Opinion for PCT/CN2021/077042 issued on May 19, 2019, and its English Translation provided by WIPO.
International Preliminary Report on Patentability for PCT/CN2021/077042 issued on Aug. 23, 2022, and its English Translation provided by WIPO.

(Continued)

*Primary Examiner* — Sai Aung
(74) *Attorney, Agent, or Firm* — Ladas & Parry, LLP

(57) ABSTRACT

The present disclosure provides a PDCCH detection method, a PDCCH transmission method, a UE and a base station. The PDCCH detection method includes: receiving a relevant parameter of a PDCCH monitoring window; determining the PDCCH monitoring window in accordance with the parameter; and detecting and receiving a PDCCH within the PDCCH monitoring window.

20 Claims, 5 Drawing Sheets

(51) Int. Cl.
  *H04W 72/0446* (2023.01)
  *H04W 72/12* (2023.01)
  *H04W 72/23* (2023.01)
  *H04W 76/20* (2018.01)

(56) References Cited

U.S. PATENT DOCUMENTS

| | | | |
|---|---|---|---|
| 2019/0313383 A1 | 10/2019 | Xiong et al. | |
| 2020/0022126 A1 | 1/2020 | You et al. | |
| 2020/0037396 A1* | 1/2020 | Islam | H04W 52/0229 |
| 2020/0205186 A1 | 6/2020 | Liu et al. | |
| 2020/0229092 A1* | 7/2020 | Wu | H04W 76/11 |
| 2021/0022079 A1* | 1/2021 | Shen | H04W 72/23 |
| 2021/0234659 A1 | 7/2021 | Tang | |
| 2021/0259027 A1* | 8/2021 | Deogun | H04W 76/11 |
| 2022/0132425 A1* | 4/2022 | Seo | H04W 52/02 |

FOREIGN PATENT DOCUMENTS

| | | |
|---|---|---|
| CN | 109716843 A | 5/2019 |
| CN | 110621073 A | 12/2019 |
| CN | 112564751 A | 3/2021 |
| WO | 2019099738 A1 | 5/2019 |
| WO | 2019184603 A1 | 10/2019 |

OTHER PUBLICATIONS

"Remaining details of RMSI," 3GPP TSG RAN WG1 Meeting AH 1801, R1-1800080, Vancouver, Canada, Jan. 22-26, 2018, Source: ZTE, Sanechips, Agenda item: 7.1.2.2, all pages.

"Default Association between SSB and Paging Monitoring," 3GPP TSG-RAN WG2 Meeting #101, R2-1803578, Athens, Greece, Feb. 26-Mar. 2, 2018, Agenda item: 10.4.5.6, Source: Qualcomm Incorporated, all pages.

First Office Action for Chinese Patent Application 202010107811.7 issued on Jan. 24, 2022 by the Chinese Patent Office, and Its English Translation.

"Remaining issues on downlink signals and channels for initial access" 3GPP TSG RAN WG1 Meeting #94bis R1-1810423, Chengdu, China, Oct. 8-12, 2018, Agenda Item: 7.1.1.1, Source: MediaTek Inc, all pages.

"Offline summary for AI 7.1.1.1 on Paging" 3GPP TSG RAN WG1 Meeting #94bis, R1-1811900, Chengdu, China, Oct. 8-12, 2018; Agenda Item: 7.1.1.1, Source: Huawei, HiSilicon, all pages.

"PDCCH enhancements for URLLC," 3GPP TSG RAN WG1 Meeting #98bis, R1-1910341, Chongqing, China, Oct. 14-20, 2019, Source: CATT, Agenda Item: 7.2.6.1, all pages.

\* cited by examiner ns # PHYSICAL DOWNLINK CONTROL CHANNEL DETECTION METHOD AND TRANSMISSION METHOD, USER EQUIPMENT AND BASE STATION

CROSS-REFERENCE TO RELATED APPLICATION

This application is the U.S. national phase of PCT Application No. PCT/CN2021/077042 filed on Feb. 20, 2021, which claims a priority of the Chinese patent application No. 202010107811.7 filed on Feb. 21, 2020, which are incorporated herein by reference in their entireties.

TECHNICAL FIELD

The present disclosure relates to the field of communication technology, in particular to a Physical Downlink Control Channel (PDCCH) detection method, a PDCCH transmission method, a User Equipment (UE) and a base station.

BACKGROUND

Currently, low-function UEs introduced into a network have low hardware cost, a long standby time, a large amount, and a small transmission bandwidth, e.g., several MHz. In order to ensure the standby time, it is necessary to reduce the detection of a PDCCH. From the perspective of a network side, when the PDCCHs are transmitted to a huge quantity of UEs within a small bandwidth, serious PDCCH collision will occur.

In a current radio system, the network side configures a downlink control channel Control Resource Set (CORESET) for the UE in accordance with the requirement on configuration, and configures a search space in the bandwidth. In addition, a small PDCCH monitoring cycle is configured, so as to provide more transmission opportunities in a time domain, thereby to reduce a PDCCH collision probability of different UEs. However, in order to reduce the PDCCH collision probability, usually the network side needs to be improved in the following two ways. In one way, the network side needs to configure a larger search space for the UE, and correspondingly, a large bandwidth is required. In the other way, the network side needs to configure relatively dense time domain monitoring positions for the UE, so the power consumption of the UE increases.

SUMMARY

An object of the present disclosure is to provide a PDCCH detection method, a PDCCH transmission method, a UE and a base station, so as to prevent the occurrence of PDCCH collision and reduce the power consumption of the UE.

In one aspect, the present disclosure provides in some embodiments a PDCCH detection method for a UE, including: receiving a relevant parameter of a PDCCH monitoring window; determining the PDCCH monitoring window in accordance with the parameter; and detecting and receiving a PDCCH within the PDCCH monitoring window.

In some possible embodiments of the present disclosure, the parameter includes at least one of the quantity of time domain units in the PDCCH monitoring window, or the quantity of Monitoring Occasions (MOs) in the PDCCH monitoring window.

In some possible embodiments of the present disclosure, in the case that the parameter includes the quantity of MOs in the PDCCH monitoring window, the receiving the relevant parameter of the PDCCH monitoring window includes receiving the parameter through UE-specific Radio Resource Control (RRC) signaling.

In some possible embodiments of the present disclosure, in the case that the parameter includes the quantity of time domain units in the PDCCH monitoring window, the determining the PDCCH monitoring window includes determining all search space monitoring time domain positions in the PDCCH monitoring window in accordance with a first association relationship between serial numbers of the time domain units where the MOs in a search space are located and the quantity of time domain units in the PDCCH monitoring window.

In some possible embodiments of the present disclosure, the first association relationship is expressed as mod (n, W)=i, where n represents the serial number of the time domain unit where the MO in the search space is located, W represents the quantity of time domain units in a PDCCH monitoring window i, i represents a quotient of n divided by W, i is an integer greater than or equal to 0, and serial numbers of the time domain units where MOs in the search space in the PDCCH monitoring window i are located satisfy the formula.

In some possible embodiments of the present disclosure, the quantity of time domain units in the PDCCH monitoring window is an integral multiple of a search space monitoring cycle.

In some possible embodiments of the present disclosure, the receiving the relevant parameter of the PDCCH monitoring window includes receiving the parameter through UE-specific RRC signaling.

In some possible embodiments of the present disclosure, in the case that the parameter includes the quantity of time domain units in the PDCCH monitoring window, the determining the PDCCH monitoring window includes determining all time domain units in the PDCCH monitoring window in accordance with a second association relationship between serial numbers of the time domain units and the quantity of time domain units in the PDCCH monitoring window.

In some possible embodiments of the present disclosure, the second association relationship is expressed as mod (m, W)=j, where m represents the serial number of the time domain unit, W represents the quantity of time domain units in a PDCCH monitoring window j, j represents a quotient of m divided by W, j is an integer greater than or equal to 0, the time domain units in the PDCCH monitoring window j include all time domain units whose serial numbers satisfy the formula, and the time domain unit includes consecutive slots or consecutive Orthogonal Frequency Division Multiplexing (OFDM) symbols.

In some possible embodiments of the present disclosure, the receiving the relevant parameter of the PDCCH monitoring window includes receiving the parameter through UE-specific RRC signaling or cell-specific RRC signaling.

In some possible embodiments of the present disclosure, one search space has a same structure in each MO in the PDCCH monitoring window, or one search space is distributed in a plurality of MOs in the PDCCH monitoring window.

In some possible embodiments of the present disclosure, in the case that one search space has a same structure in each MO in the PDCCH monitoring window, the PDCCH detection method further includes stopping the detection of the PDCCH in remaining MOs in the PDCCH monitoring window after a desired Downlink Control Information (DCI) format has been detected and received in any MO in the PDCCH monitoring window.

In some possible embodiments of the present disclosure, in the case that one search space is distributed in the plurality of MOs in the PDCCH monitoring window, the PDCCH detection method further includes stopping the detection of the PDCCH on remaining candidate positions in the search space after the desired DCI format has been detected and received on any candidate position in the search space.

In another aspect, the present disclosure provides in some embodiments a PDCCH transmission method for a base station, including: transmitting a relevant parameter of a PDCCH monitoring window; determining the PDCCH monitoring window in accordance with the parameter; and transmitting a PDCCH within the PDCCH monitoring window.

In some possible embodiments of the present disclosure, the parameter includes at least one of the quantity of time domain units in the PDCCH monitoring window, or the quantity of MOs in the PDCCH monitoring window.

In some possible embodiments of the present disclosure, in the case that the parameter includes the quantity of MOs in the PDCCH monitoring window, the transmitting the relevant parameter of the PDCCH monitoring window includes transmitting the parameter through UE-specific RRC signaling.

In some possible embodiments of the present disclosure, in the case that the parameter includes the quantity of time domain units in the PDCCH monitoring window, the determining the PDCCH monitoring window includes determining all search space monitoring time domain positions in the PDCCH monitoring window in accordance with a first association relationship between serial numbers of the time domain units where the MOs in a search space are located and the quantity of time domain units in the PDCCH monitoring window.

In some possible embodiments of the present disclosure, the first association relationship is expressed as mod (n, W)=i, where n represents the serial number of the time domain unit where the MO in the search space is located, W represents the quantity of time domain units in a PDCCH monitoring window i, i represents a quotient of n divided by W, i is an integer greater than or equal to 0, and serial numbers of the time domain units where MOs in the search space in the PDCCH monitoring window i are located satisfy the formula.

In some possible embodiments of the present disclosure, the quantity of time domain units in the PDCCH monitoring window is an integral multiple of a search space monitoring cycle.

In some possible embodiments of the present disclosure, the transmitting the relevant parameter of the PDCCH monitoring window includes transmitting the parameter through UE-specific RRC signaling.

In some possible embodiments of the present disclosure, in the case that the parameter includes the quantity of time domain units in the PDCCH monitoring window, the determining the PDCCH monitoring window includes determining all time domain units in the PDCCH monitoring window in accordance with a second association relationship between serial numbers of the time domain units and the quantity of time domain units in the PDCCH monitoring window.

In some possible embodiments of the present disclosure, the second association relationship is expressed as mod (m, W)=j, where m represents the serial number of the time domain unit, W represents the quantity of time domain units in a PDCCH monitoring window j, j represents a quotient of m divided by W, j is an integer greater than or equal to 0, the time domain units in the PDCCH monitoring window j include all time domain units whose serial numbers satisfy the formula, and the time domain unit includes consecutive slots or consecutive OFDM symbols.

In some possible embodiments of the present disclosure, the transmitting the relevant parameter of the PDCCH monitoring window includes transmitting the parameter through UE-specific RRC signaling or cell-specific RRC signaling.

In yet another aspect, the present disclosure provides in some embodiments a UE, including a transceiver, a memory, a processor, and a computer program stored in the memory and executed by the processor. The processor is configured to execute the computer program so as to: receive a relevant parameter of a PDCCH monitoring window; determine the PDCCH monitoring window in accordance with the parameter; and detect and receive a PDCCH within the PDCCH monitoring window.

In some possible embodiments of the present disclosure, the parameter includes at least one of the quantity of time domain units in the PDCCH monitoring window, or the quantity of MOs in the PDCCH monitoring window.

In some possible embodiments of the present disclosure, in the case that the parameter includes the quantity of MOs in the PDCCH monitoring window, the processor is further configured to execute the computer program so as to receive the parameter through UE-specific RRC signaling.

In some possible embodiments of the present disclosure, in the case that the parameter includes the quantity of time domain units in the PDCCH monitoring window, the processor is further configured to execute the computer program so as to determine all search space monitoring time domain positions in the PDCCH monitoring window in accordance with a first association relationship between serial numbers of the time domain units where the MOs in a search space are located and the quantity of time domain units in the PDCCH monitoring window.

In some possible embodiments of the present disclosure, the first association relationship is expressed as mod (n, W)=i, where n represents the serial number of the time domain unit where the MO in the search space is located, W represents the quantity of time domain units in a PDCCH monitoring window i, i represents a quotient of n divided by W, i is an integer greater than or equal to 0, and serial numbers of the time domain units where MOs in the search space in the PDCCH monitoring window i are located satisfy the formula.

In some possible embodiments of the present disclosure, the quantity of time domain units in the PDCCH monitoring window is an integral multiple of a search space monitoring cycle.

In some possible embodiments of the present disclosure, the processor is further configured to execute the computer program so as to receive the parameter through UE-specific RRC signaling.

In some possible embodiments of the present disclosure, in the case that the parameter includes the quantity of time domain units in the PDCCH monitoring window, the processor is further configured to execute the computer program so as to determine all time domain units in the PDCCH monitoring window in accordance with a second association relationship between serial numbers of the time domain units and the quantity of time domain units in the PDCCH monitoring window.

In some possible embodiments of the present disclosure, the second association relationship is expressed as mod (m, W)=j, where m represents the serial number of the time domain unit, W represents the quantity of time domain units in a PDCCH monitoring window j, j represents a quotient of m divided by W, j is an integer greater than or equal to 0, the time domain units in the PDCCH monitoring window j include all time domain units whose serial numbers satisfy the formula, and the time domain unit includes consecutive slots or consecutive OFDM symbols.

In some possible embodiments of the present disclosure, the processor is further configured to execute the computer program so as to receive the parameter through UE-specific RRC signaling or cell-specific RRC signaling.

In some possible embodiments of the present disclosure, one search space has a same structure in each MO in the PDCCH monitoring window, or one search space is distributed in a plurality of MOs in the PDCCH monitoring window.

In some possible embodiments of the present disclosure, in the case that one search space has a same structure in each MO in the PDCCH monitoring window, the processor is further configured to execute the computer program so as to stop the detection of the PDCCH in remaining MOs in the PDCCH monitoring window after a desired DCI format has been detected and received in any MO in the PDCCH monitoring window.

In some possible embodiments of the present disclosure, in the case that one search space is distributed in the plurality of MOs in the PDCCH monitoring window, the processor is further configured to execute the computer program so as to stop the detection of the PDCCH on remaining candidate positions in the search space after the desired DCI format has been detected and received on any candidate position in the search space.

In still yet another aspect, the present disclosure provides in some embodiments a base station, including a transceiver, a memory, a processor, and a computer program stored in the memory and executed by the processor. The processor is configured to execute the computer program so as to: transmit a relevant parameter of a PDCCH monitoring window; determine the PDCCH monitoring window in accordance with the parameter; and transmit a PDCCH within the PDCCH monitoring window.

In some possible embodiments of the present disclosure, the parameter includes at least one of the quantity of time domain units in the PDCCH monitoring window, or the quantity of MOs in the PDCCH monitoring window.

In some possible embodiments of the present disclosure, in the case that the parameter includes the quantity of MOs in the PDCCH monitoring window, the processor is further configured to execute the computer program so as to transmit the parameter through UE-specific RRC signaling.

In some possible embodiments of the present disclosure, in the case that the parameter includes the quantity of time domain units in the PDCCH monitoring window, the processor is further configured to execute the computer program so as to determine all search space monitoring time domain positions in the PDCCH monitoring window in accordance with a first association relationship between serial numbers of the time domain units where the MOs in a search space are located and the quantity of time domain units in the PDCCH monitoring window.

In some possible embodiments of the present disclosure, the first association relationship is expressed as mod (n, W)=i, where n represents the serial number of the time domain unit where the MO in the search space is located, W represents the quantity of time domain units in a PDCCH monitoring window i, i represents a quotient of n divided by W, i is an integer greater than or equal to 0, and serial numbers of the time domain units where MOs in the search space in the PDCCH monitoring window i are located satisfy the formula.

In some possible embodiments of the present disclosure, the quantity of time domain units in the PDCCH monitoring window is an integral multiple of a search space monitoring cycle.

In some possible embodiments of the present disclosure, the processor is further configured to execute the computer program so as to transmit the parameter through UE-specific RRC signaling.

In some possible embodiments of the present disclosure, in the case that the parameter includes the quantity of time domain units in the PDCCH monitoring window, the processor is further configured to execute the computer program so as to determine all time domain units in the PDCCH monitoring window in accordance with a second association relationship between serial numbers of the time domain units and the quantity of time domain units in the PDCCH monitoring window.

In some possible embodiments of the present disclosure, the second association relationship is expressed as mod (m, W)=j, where m represents the serial number of the time domain unit, W represents the quantity of time domain units in a PDCCH monitoring window j, j represents a quotient of m divided by W, j is an integer greater than or equal to 0, the time domain units in the PDCCH monitoring window j include all time domain units whose serial numbers satisfy the formula, and the time domain unit includes consecutive slots or consecutive OFDM symbols.

In some possible embodiments of the present disclosure, the processor is further configured to execute the computer program so as to transmit the parameter through UE-specific RRC signaling or cell-specific RRC signaling.

In still yet another aspect, the present disclosure provides in some embodiments a UE, including: a first reception module configured to receive a relevant parameter of a PDCCH monitoring window; a first determination module configured to determine the PDCCH monitoring window in accordance with the parameter; and a first processing module configured to detect and receive a PDCCH within the PDCCH monitoring window.

In still yet another aspect, the present disclosure provides in some embodiments a base station, including: a first transmission module configured to transmit a relevant parameter of a PDCCH monitoring window; a second determination module configured to determine the PDCCH monitoring window in accordance with the parameter; and a second transmission module configured to transmit a PDCCH within the PDCCH monitoring window.

In still yet another aspect, the present disclosure provides in some embodiments a computer-readable storage medium storing therein a computer program. The computer program is executed by a processor so as to implement the steps of the above-mentioned PDCCH detection method for the UE, or the steps of the above-mentioned PDCCH transmission method for the base station.

The present disclosure has the following beneficial effects. The PDCCH monitoring window is determined in accordance with the received relevant parameter of the PDCCH monitoring window, and then the PDCCH is detected and received within the PDCCH monitoring window. As a result, it is able to effectively reduce a PDCCH collision probability in a small-bandwidth scenario, and reduce an overhead of the UE.

DETAILED DESCRIPTION

In order to make the objects, the technical solutions and the advantages of the present disclosure more apparent, the present disclosure will be described hereinafter in a clear and complete manner in conjunction with the drawings and embodiments. In the following description, specific details of configurations and assemblies are merely provided to facilitate the understanding of the present disclosure. It should be appreciated that, a person skilled in the art may make further modifications and alternations without departing from the spirit of the present disclosure. In addition, for clarification, any known function and structure will not be described hereinafter.

It should be further appreciated that, such phrases as "one embodiment" and "one of the embodiments" intend to indicate that the features, structures or characteristics are contained in at least one embodiment of the present disclosure, rather than referring to a same embodiment. In addition, the features, structures or characteristics may be combined in any embodiment or embodiments in an appropriate manner.

It should be further appreciated that, serial numbers of the steps shall not be used to define the order of the steps, and instead, the order of the steps shall be determined in accordance with their functions and internal logics.

In addition, the terms "system" and "network" may be exchangeable with each other.

In the embodiments of the present disclosure, it should be appreciated that, the expression "B corresponding to A" means that B is associated with A and may be determined in accordance with A. However, when B is determined in accordance with A, it means that B may be determined in accordance with A and/or any other information.

In the embodiments of the present disclosure, an access network may be in various forms, and it may include a macro base station, a pico base station, a Node B (for $3^{rd}$-Generation (3G) mobile base station), an evolved Node B (eNB), a femto eNB (or home eNode B, home eNB or HeNB), a relay, an access point, a Remote Radio Unit (RRU), or a Remote Radio Head (RRH). A UE may be a mobile phone (or cell phone), or any other device capable of transmitting or receiving a radio signal, e.g., a terminal, a Personal Digital Assistant (PDA), a wireless modem, a wireless communication device, a handheld device, a laptop computer, a cordless telephone, a Wireless Local Loop (WLL) station, a Customer Premise Equipment (CPE) or an Mifi capable of converting a mobile signal into a Wireless Fidelity (WiFi) signal, an intelligent household electrical appliance, or any other device capable of spontaneously communicating with a mobile communication network.

Figure 1:
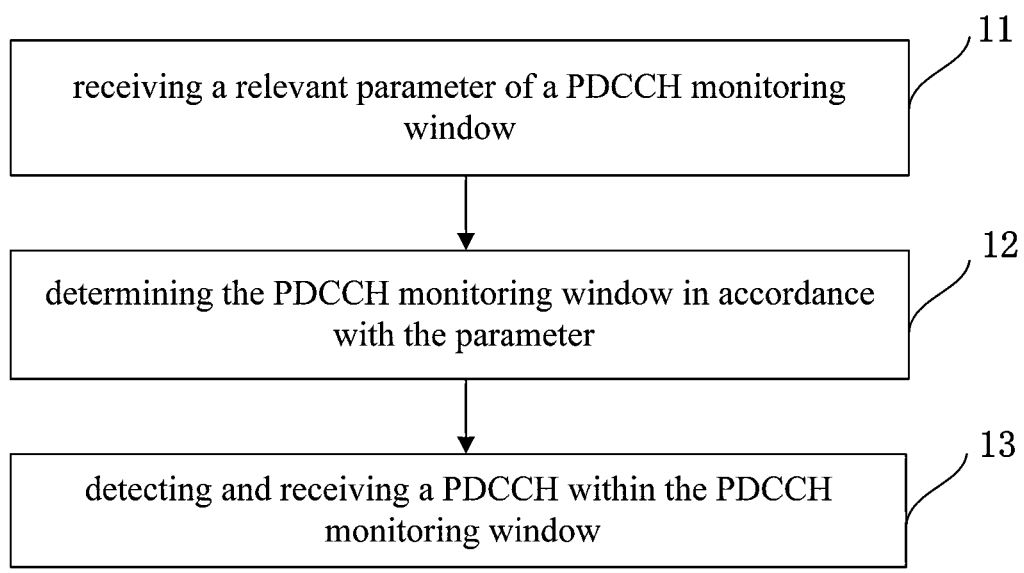
FIG. 1 is a flow chart of a PDCCH detection method according to one embodiment of the present disclosure.

As shown in FIG. 1, the present disclosure provides in some embodiments a PDCCH detection method for a UE, which includes the following steps.

Step 11: receiving a relevant parameter of a PDCCH monitoring window.

To be specific, the UE receives the relevant parameter of the PDCCH monitoring window configured by a base station through high-layer signaling. The high-layer signaling is UE-specific RRC signaling or cell-specific RRC signaling.

In some possible embodiments of the present disclosure, the parameter includes at least one of the quantity of time domain units in the PDCCH monitoring window, or the quantity of MOs in the PDCCH monitoring window.

Step 12: determining the PDCCH monitoring window in accordance with the parameter.

To be specific, upon the receipt of the parameter, the UE determines the composition of the PDCCH monitoring window in accordance with the parameter. The parameter is configured in accordance with a type of the UE.

Step 13: detecting and receiving a PDCCH within the PDCCH monitoring window.

To be specific, the base station configures a cycle of the PDCCH monitoring window, and the UE detects and receives the PDCCH within a time domain range determined in accordance with the cycle of the PDCCH monitoring window.

According to the embodiments of the present disclosure, the PDCCH monitoring window is determined in accordance with the received relevant parameter of the PDCCH monitoring window, and the PDCCH is detected and received within the PDCCH monitoring window. As a result, it is able to effectively reduce a PDCCH collision probability in a small-bandwidth scenario, and reduce an overhead for the UE.

Further, in the case that the parameter includes the quantity of MOs in the PDCCH monitoring window, Step 11 specifically includes receiving the parameter through UE-specific RRC signaling.

To be specific, the base station configures the quantity of MOs in the PDCCH monitoring window through the UE-specific RRC signaling, and the UE determines the composition of the PDCCH monitoring window in accordance with the quantity of MOs.

Further, in the case that the parameter includes the quantity of time domain units in the PDCCH monitoring window, Step 12 specifically includes determining all search space monitoring time domain positions in the PDCCH monitoring window in accordance with a first association relationship between serial numbers of the time domain units where the MOs in a search space are located and the quantity of time domain units in the PDCCH monitoring window.

In some possible embodiments of the present disclosure, the first association relationship is expressed as mod (n, W)=i, where n represents the serial number of the time domain unit where the MO in the search space is located, W represents the quantity of time domain units in a PDCCH monitoring window i, i represents a quotient of n divided by W, i is an integer greater than or equal to 0, and serial numbers of the time domain units where MOs in the search space in the PDCCH monitoring window i are located satisfy the formula.

To be specific, when a serial number of a time domain unit where the MO in the search space is located is n, all the MOs satisfying the above formula belong to the PDCCH monitoring window. The search space monitoring time domain position is called as an MO. For example, when n is 2 and W is 10, i is 0; and when n is 5 and W is 10, i is 0. Hence, the MOs in the search space in the time domain units with serials numbers 2 and 5 belong to one PDCCH monitoring window. A serial number of the PDCCH monitoring window is defined in accordance with a value of i (e.g., all MOs belong to a PDCCH monitoring window #0 when i is 0, and all MOs belong to a PDCCH monitoring window #1 when i is 1).

Further, the quantity of time domain units in the PDCCH monitoring window is an integral multiple of a search space monitoring cycle.

For example, when the search space (SS) monitoring cycle is T, W is a product of N and T, where N is a positive integer greater than or equal to 1.

Further, Step 11 specifically includes receiving the parameter through UE-specific RRC signaling.

To be specific, the UE receives the quantity of time domain units in the PDCCH monitoring window configured by the base station through UE-specific RRC signaling, so that the UE determines the composition of the PDCCH monitoring window in accordance with the first association relationship between the serial numbers of the time domain units where the MOs in the search space are located and the quantity of time domain units in the PDCCH monitoring window.

Further, in the case that the parameter includes the quantity of time domain units in the PDCCH monitoring window, Step 12 specifically includes determining all time domain units in the PDCCH monitoring window in accordance with a second association relationship between serial numbers of the time domain units and the quantity of time domain units in the PDCCH monitoring window.

In some possible embodiments of the present disclosure, the second association relationship is expressed as mod (m, W)=j, where m represents the serial number of the time domain unit, W represents the quantity of time domain units in a PDCCH monitoring window j, j represents a quotient of m divided by W, j is an integer greater than or equal to 0, the time domain units in the PDCCH monitoring window j include all time domain units whose serial numbers satisfy the formula, and the time domain unit includes consecutive slots or consecutive Orthogonal Frequency Division Multiplexing (OFDM) symbols.

To be specific, the composition of the PDCCH monitoring window is determined in accordance with absolute serial numbers of the time domain units, i.e., all the time domain units satisfying the above formula belong to one PDCCH monitoring window. For example, when W is 10 and m is 0 to 9, j is 0. At this time, all the time domain nits with the serial numbers 0 to 9 belong to one PDCCH monitoring window, where j is a serial number of the PDCCH monitoring window.

Further, Step 11 specifically includes receiving the parameter through UE-specific RRC signaling or cell-specific RRC signaling.

To be specific, the UE receives the quantity of time domain units in the PDCCH monitoring window configured by the base station through high-layer signaling, so that the UE determines the composition of the PDCCH monitoring window in accordance with the second association relationship between the serial numbers of the time domain units and the quantity of time domain units in the PDCCH monitoring window. The high-layer signaling is UE-specific RRC signaling, cell-specific RRC signaling, or signaling which is effective with respect to a group of UEs (a plurality of UEs).

Further, one search space has a same structure in each MO in the PDCCH monitoring window, or one search space is distributed in a plurality of MOs in the PDCCH monitoring window.

To be specific, one search space has a same structure in each MO, e.g., one search space includes a plurality of candidate positions and each MO includes the plurality of candidate positions; or one search space is distributed on a plurality of time domain monitoring positions in the PDCCH monitoring window (i.e., one search space is distributed within the PDCCH monitoring window in a time-division multiplexing manner), e.g., one search space includes a plurality of candidate positions and each candidate position is distributed on one MO.

Further, in the case that one search space has a same structure in each MO in the PDCCH monitoring window, the PDCCH detection method further includes stopping the detection of the PDCCH in remaining MOs in the PDCCH monitoring window after a desired DCI format has been detected and received in any MO in the PDCCH monitoring window.

To be specific, the UE stops the detection of the PDCCH in the remaining MOs in the search space after it has detected and received a predetermined quantity of desired DCI formats in any MO in the search space.

Further, in the case that one search space is distributed in the plurality of MOs in the PDCCH monitoring window, the PDCCH detection method further includes stopping the detection of the PDCCH on remaining candidate positions in the search space after the desired DCI format has been detected and received on any candidate position in the search space.

To be specific, after the UE has detected and received the desired DCI format on any P PDCCH candidates, it stops the detection of the PDCCH on the other PDCCH candidates within the search space, where P is a positive integer greater than or equal to 1, and a value of P is determined in accordance with a UE capability.

The method will be described hereinafter in more details in conjunction with specific embodiments (an embodiment involving UE behaviors corresponds to an embodiment involving base station behaviors).

First Embodiment

Figure 2:
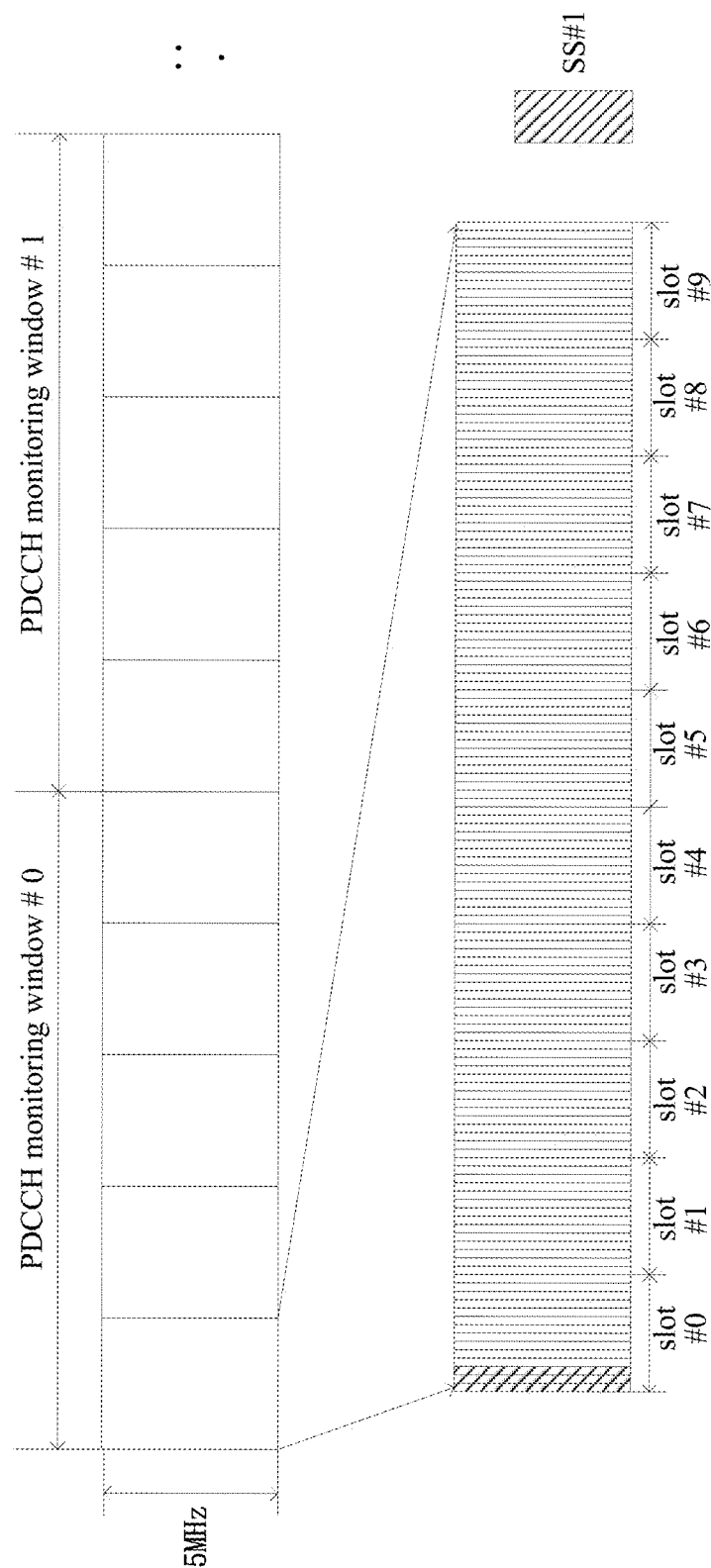
FIG. 2 is a schematic view showing a PDCCH monitoring window according to one embodiment of the present disclosure.

As shown in FIG. 2, the base station configures the PDCCH monitoring window for the UE through UE-specific RRC signaling. Presumed that the base station has configured SS #1 for the UE, a monitoring cycle of SS #1 includes T slots and the base station has further configured the quantity of slots in the PDCCH monitoring window for the UE, the quantity of slots in the PDCCH monitoring window and the monitoring cycle of the SS #1 satisfy W=N·T.

In this embodiment of the present disclosure, T=10, N=5, and a transmission bandwidth is 5 MHz.

To be specific, when an offset value of the search space monitoring time domain position configured by the base station for the UE is 0, the UE detects and receives the PDCCH in the configured search space on slot #0, slot #10 and slot #2. The search space monitoring time domain point is called as an MO. Each PDCCH monitoring window is determined as follows.

When a slot where the MO in the search space (or a slot where the search space is monitored) is #n, all MOs satisfying mod (n, W)=i belong to a PDCCH monitoring window i. For example, when W is 50 and the slot is any one of slot #0 to slot #49, i is 0. At this time, a PDCCH monitoring window #0 includes slot #0 to slot #49, and PDCCH monitoring slots in the PDCCH monitoring window #0 are {#0, #10, #20, #30, #40}. Similarly, PDCCH monitoring slots in a PDDCH monitoring window #1 are {#50, #60, #70, #80, #90}, and PDCCH monitoring slots in a PDDCH monitoring window #3 are {#100, #110, #120, #130, #140}.

The UE detects the PDCCH in each PDCCH monitoring window in accordance with the configured DCI format. For example, when the DCI formats configured by the base station for the UE in the search space include one or more specific DCI formats, the UE detects the PDCCH in the PDCCH monitoring window in accordance with the configured DCI formats. When the UE has detected and received a desired DCI format in any monitoring position in the PDCCH monitoring window, the UE does not detect the PDCCH in accordance with the DCI format on the remaining monitoring positions in the PDCCH monitoring window. In other words, when the UE has detected and received a desired DCI format in the PDCCH monitoring window, the UE does not detect the PDCCH in accordance with the DCI format on subsequent monitoring positions in the PDCCH monitoring window. The relevant parameter of the PDCCH monitoring window is configured in accordance with each search space.

Second Embodiment

Figure 3:
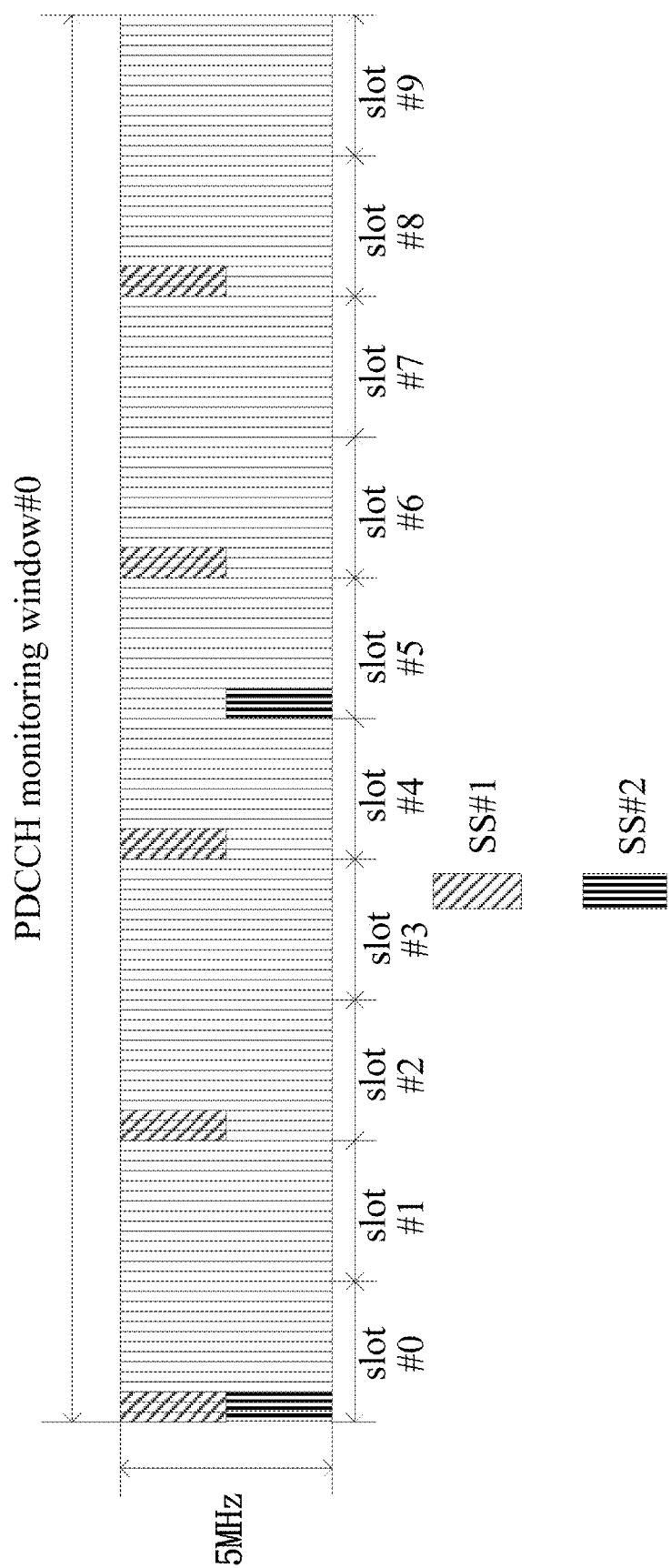
FIG. 3 is another schematic view showing the PDCCH monitoring window according to one embodiment of the present disclosure.

As shown in FIG. 3, the base station configures a length of the PDCCH monitoring window for the UE, and the length includes W slots, where W is a positive integer greater than or equal to 1. In this embodiment of the present disclosure, W=10, the transmission bandwidth is 5 MHz, and the slots in each PDCCH monitoring window are determined as follows.

All slots satisfying mod (m, W)=j form a PDCCH monitoring window j. After the UE has detected and received a desired DCI format in any search space within any slot in the PDCCH monitoring window, it skips the detection in the search space within the remaining slots in the PDCCH monitoring window.

When the base station has configured SS #1 and SS #2 for the UE, a monitoring cycle of SS #1 includes two slots, a monitoring cycle of SS #2 includes five slots and a time domain offset value of each of SS #1 and SS #2 is 0, serial numbers of monitoring slots for SS #1 are {#0, #2, #4, #6 . . . }, and serial numbers of monitoring slots for SS #2 are {#0, #5, #10, #15 . . . }. FIG. 3 shows the PDCCH monitoring window.

The UE detects and receives the PDCCH in each search space in one PDCCH monitoring window. When the UE has detected and received a desired DCI format in a certain search space in the PDCCH monitoring window, it does not monitor the search space within the subsequent slots in the PDCCH monitoring window. For example, when the UE has detected and received a desired DCI format in SS #1 within slot #0, it does not monitor SS #1 on the subsequent monitoring positions in the PDCCH monitoring window. When the UE fails to detect and receive any desired DCI format in SS #2 within slot #0, it continues to monitor SS #2 on the subsequent positions in the PDCCH monitoring window. The PDCCH monitoring window is configured through cell-specific RRC signaling or UE-specific RRC signaling. The base station may also configure merely one search space for the UE, which will not be particularly defined herein.

Third Embodiment

The base station configures the quantity of MOs in the PDCCH monitoring window for the UE, and the PDCCH monitoring window is determined in accordance with the quantity of MOs. The relevant parameter of the PDCCH monitoring window is configured in accordance with each search space. For example, when the base station configures SS #1 for the UE, a monitoring cycle of SS #1 includes 10 slots and a time domain offset value is 0, the UE monitors the PDCCH in the configured search space within slot #0, slot #10 and slot #20. When the PDCCH monitoring window includes 5 MOs, positions of the MOs in a first PDCCH monitoring window are slot #0, slot #10, slot #20, slot #30 and slot #40, and so on.

Fourth Embodiment

The base station configures a monitoring cycle for the PDCCH monitoring window, and the UE merely detects and receives the PDCCH in the PDCCH monitoring window determined in accordance with the monitoring cycle. For example, when the monitoring cycle of the PDCCH monitoring window includes 40 slots and the time domain offset value is 0, the UE merely detects and receives the PDCCH in a PDCCH monitoring window where an initial slot serial number satisfies mod (n, 40)=0. An offset value of the PDCCH monitoring window is any integer greater than 0, and its function is similar to an offset value of a current search space, which will not be particularly defined herein.

According to the embodiments of the present disclosure, the PDCCH monitoring window is determined in accordance with the received relevant parameter of the PDCCH monitoring window. Next, the PDCCH is detected and received in the PDCCH monitoring window, and the detection of the PDCCH is stopped on the remaining MOs in the PDCCH monitoring window after the desired DCI format has been detected and received in any MO in the PDCCH monitoring window, or the detection of the PDCCH is stopped on the remaining candidate positions in the search space after the desired DCI format has been detected and received on any candidate position in the search space. As a result, it is able to effectively reduce a PDCCH collision probability in a small-bandwidth scenario, and reduce an overhead for the UE.

Figure 4:
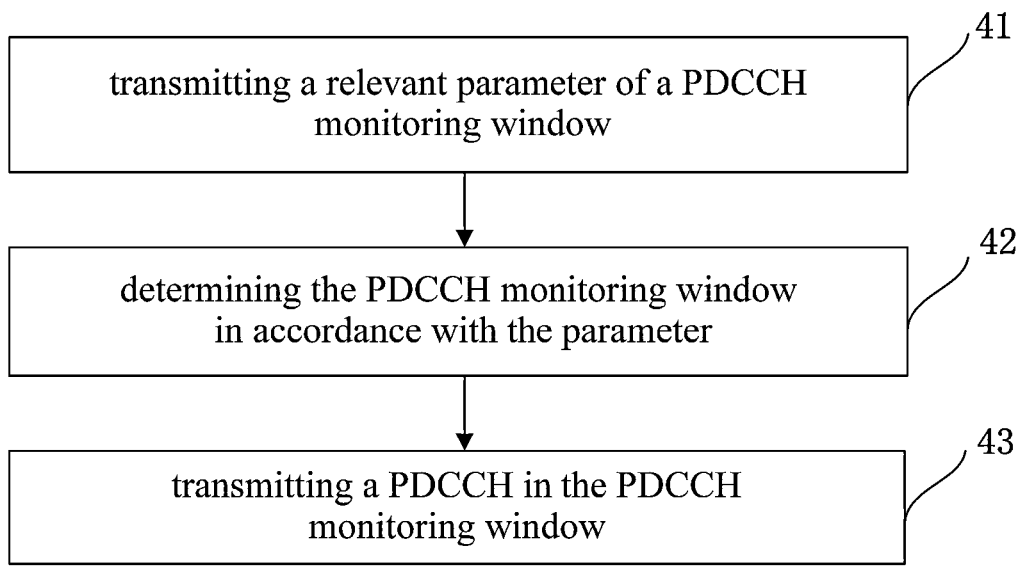
FIG. 4 is a flow chart of a PDCCH transmission method according to one embodiment of the present disclosure.

As shown in FIG. 4, the present disclosure further provides in some embodiments a PDCCH transmission method for a base station, which includes the following steps.

Step 41: transmitting a relevant parameter of a PDCCH monitoring window.

To be specific, the base station configures the relevant parameter of the PDCCH monitoring window through high-layer signaling. The high-layer signaling is UE-specific RRC signaling or cell-specific RRC signaling.

In some possible embodiments of the present disclosure, the parameter includes at least one of the quantity of time domain units in the PDCCH monitoring window, or the quantity of MOs in the PDCCH monitoring window.

Step 42: determining the PDCCH monitoring window in accordance with the parameter.

To be specific, the base station determines the composition of the PDCCH monitoring window in accordance with the parameter, and the parameter is configured in accordance with a type of a UE.

Step 43: transmitting the PDCCH in the PDCCH monitoring window.

To be specific, the base station configures a cycle of the PDCCH monitoring window, and transmits the PDCCH within a time domain range determined in accordance with the cycle of the PDCCH monitoring window.

According to the embodiments of the present disclosure, the PDCCH monitoring window is determined in accordance with the configured relevant parameter of the PDCCH monitoring window, and the PDCCH is transmitted within the PDCCH monitoring window so that the UE detects and receives the PDCCH in the PDCCH monitoring window. As a result, it is able to effectively reduce a PDCCH collision probability in a small-bandwidth scenario, and reduce an overhead for the UE.

In some possible embodiments of the present disclosure, in the case that the parameter includes the quantity of MOs in the PDCCH monitoring window, Step 41 specifically includes transmitting the parameter through UE-specific RRC signaling.

To be specific, the base station configures the quantity of MOs in the PDCCH monitoring window through UE-specific RRC signaling, and determines the composition of the PDCCH monitoring window in accordance with the quantity of MOs.

Further, in the case that the parameter includes the quantity of time domain units in the PDCCH monitoring window, Step 42 specifically includes determining all search space monitoring time domain positions in the PDCCH monitoring window in accordance with a first association relationship between serial numbers of the time domain units where the MOs in a search space are located and the quantity of time domain units in the PDCCH monitoring window.

In some possible embodiments of the present disclosure, the first association relationship is expressed as $\mod(n, W) = i$, where n represents the serial number of the time domain unit where the MO in the search space is located, W represents the quantity of time domain units in a PDCCH monitoring window i, i represents a quotient of n divided by W, i is an integer greater than or equal to 0, and serial numbers of the time domain units where MOs in the search space in the PDCCH monitoring window i are located satisfy the formula.

To be specific, when a serial number of a time domain unit where the MO in the search space is located is n, all the MOs satisfying the above formula belong to the PDCCH monitoring window. The search space monitoring time domain position is called as an MO. For example, when n is 2 and W is 10, i is 0; and when n is 5 and W is 10, i is 0. Hence, the MOs in the search space in the time domain units with serials numbers 2 and 5 belong to one PDCCH monitoring window. A serial number of the PDCCH monitoring window is defined in accordance with a value of i (e.g., all MOs belong to a PDCCH monitoring window #0 when i is 0, and all MOs belong to a PDCCH monitoring window #1 when i is 1).

Further, the quantity of time domain units in the PDCCH monitoring window is an integral multiple of a search space monitoring cycle.

For example, when the search space monitoring cycle is T, W is a product of N and T, where N is a positive integer greater than or equal to 1.

Further, Step 41 specifically includes transmitting the parameter through UE-specific RRC signaling.

To be specific, the base station configures the quantity of time domain units in the PDCCH monitoring window through UE-specific RRC signaling, so that the UE and the base station determine the composition of the PDCCH monitoring window in accordance with the first association relationship between the serial numbers of the time domain units where the MOs in the search space are located and the quantity of time domain units in the PDCCH monitoring window.

Further, in the case that the parameter includes the quantity of time domain units in the PDCCH monitoring window, Step 42 specifically includes determining all time domain units in the PDCCH monitoring window in accordance with a second association relationship between serial numbers of the time domain units and the quantity of time domain units in the PDCCH monitoring window.

In some possible embodiments of the present disclosure, the second association relationship is expressed as $\mod(m, W) = j$, where m represents the serial number of the time domain unit, W represents the quantity of time domain units in a PDCCH monitoring window j, j represents a quotient of m divided by W, j is an integer greater than or equal to 0, the time domain units in the PDCCH monitoring window j include all time domain units whose serial numbers satisfy the formula, and the time domain unit includes consecutive slots or consecutive OFDM symbols.

To be specific, the composition of the PDCCH monitoring window is determined in accordance with absolute serial numbers of the time domain units, i.e., all the time domain units satisfying the above formula belong to one PDCCH monitoring window. For example, when W is 10 and m is 0 to 9, j is 0. At this time, all the time domain nits with the serial numbers 0 to 9 belong to one PDCCH monitoring window, where j is a serial number of the PDCCH monitoring window.

Further, Step 41 specifically includes transmitting the parameter through UE-specific RRC signaling or cell-specific RRC signaling.

To be specific, the UE receives the quantity of time domain units in the PDCCH monitoring window configured by the base station through high-layer signaling, so that the UE determines the composition of the PDCCH monitoring window in accordance with the second association relationship between the serial numbers of the time domain units and the quantity of time domain units in the PDCCH monitoring window. The high-layer signaling is UE-specific RRC signaling, cell-specific RRC signaling, or signaling which is effective with respect to a group of UEs (a plurality of UEs).

According to the embodiments of the present disclosure, the PDCCH monitoring window is determined in accordance with the configured relevant parameter of the PDCCH monitoring window, and then the PDCCH is transmitted in the PDCCH monitoring window, so that the UE detects and receives the PDCCH in the PDCCH monitoring window. As a result, it is able to effectively reduce a PDCCH collision probability in a small-bandwidth scenario, and reduce an overhead for the UE.

Figure 5:
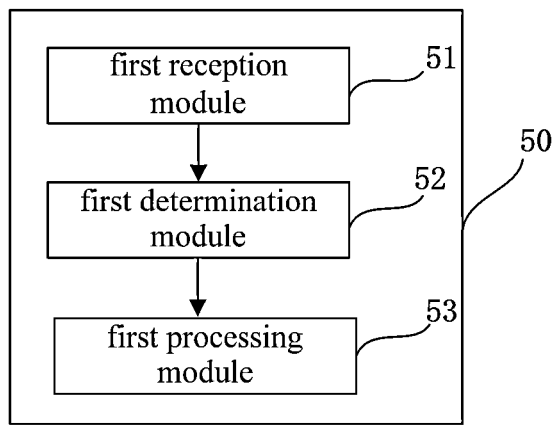
FIG. 5 is a block diagram of a UE according to one embodiment of the present disclosure.

As shown in FIG. 5, the present disclosure further provides in some embodiments a UE 50, which includes: a first reception module 51 configured to receive a relevant parameter of a PDCCH monitoring window; a first determination module 52 configured to determine the PDCCH monitoring window in accordance with the parameter; and a first processing module 53 configured to detect and receive a PDCCH within the PDCCH monitoring window.

In some possible embodiments of the present disclosure, the parameter includes at least one of the quantity of time domain units in the PDCCH monitoring window, or the quantity of MOs in the PDCCH monitoring window.

In some possible embodiments of the present disclosure, in the case that the parameter includes the quantity of MOs in the PDCCH monitoring window, the first reception module 51 includes a first reception unit configured to receive the parameter through UE-specific RRC signaling.

In some possible embodiments of the present disclosure, in the case that the parameter includes the quantity of time domain units in the PDCCH monitoring window, the first determination module 52 includes a first determination unit configured to determine all search space monitoring time domain positions in the PDCCH monitoring window in accordance with a first association relationship between serial numbers of the time domain units where the MOs in a search space are located and the quantity of time domain units in the PDCCH monitoring window.

In some possible embodiments of the present disclosure, the first association relationship is expressed as mod (n, W)=i, where n represents the serial number of the time domain unit where the MO in the search space is located, W represents the quantity of time domain units in a PDCCH monitoring window i, i represents a quotient of n divided by W, i is an integer greater than or equal to 0, and serial numbers of the time domain units where MOs in the search space in the PDCCH monitoring window i are located satisfy the formula.

In some possible embodiments of the present disclosure, the quantity of time domain units in the PDCCH monitoring window is an integral multiple of a search space monitoring cycle.

In some possible embodiments of the present disclosure, the first reception module 51 includes a second reception unit configured to receive the parameter through UE-specific RRC signaling.

In some possible embodiments of the present disclosure, in the case that the parameter includes the quantity of time domain units in the PDCCH monitoring window, the first determination module 52 includes a second determination unit configured to determine all time domain units in the PDCCH monitoring window in accordance with a second association relationship between serial numbers of the time domain units and the quantity of time domain units in the PDCCH monitoring window.

In some possible embodiments of the present disclosure, the second association relationship is expressed as mod (m, W)=j, where m represents the serial number of the time domain unit, W represents the quantity of time domain units in a PDCCH monitoring window j, j represents a quotient of m divided by W, j is an integer greater than or equal to 0, the time domain units in the PDCCH monitoring window j include all time domain units whose serial numbers satisfy the formula, and the time domain unit includes consecutive slots or consecutive OFDM symbols.

In some possible embodiments of the present disclosure, the first reception module 51 includes a third reception unit configured to receive the parameter through UE-specific RRC signaling or cell-specific RRC signaling.

In some possible embodiments of the present disclosure, one search space has a same structure in each MO in the PDCCH monitoring window, or one search space is distributed in a plurality of MOs in the PDCCH monitoring window.

In some possible embodiments of the present disclosure, in the case that one search space has a same structure in each MO in the PDCCH monitoring window, the UE 50 further includes a second processing module configured to stop the detection of the PDCCH in remaining MOs in the PDCCH monitoring window after a desired DCI format has been detected and received in any MO in the PDCCH monitoring window.

In some possible embodiments of the present disclosure, in the case that one search space is distributed in the plurality of MOs in the PDCCH monitoring window, the UE 50 further includes a third processing module configured to stop the detection of the PDCCH on remaining candidate positions in the search space after the desired DCI format has been detected and received on any candidate position in the search space.

It should be appreciated that, the UE corresponds to the above-mentioned PDCCH detection method for the UE, and the implementation of the UE may refer to that of the above-mentioned PDCCH detection method with a same technical effect, which will not be particularly defined herein.

Figure 6:
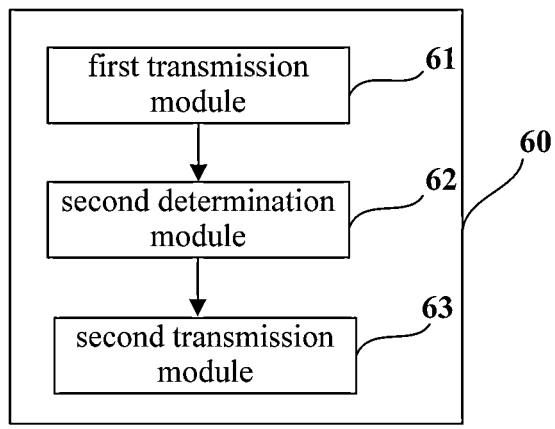
FIG. 6 is a block diagram of a base station according to one embodiment of the present disclosure.

As shown in FIG. 6, the present disclosure further provides in some embodiments a base station 60, which includes: a first transmission module 61 configured to transmit a relevant parameter of a PDCCH monitoring window; a second determination module 62 configured to determine the PDCCH monitoring window in accordance with the parameter; and a second transmission module 63 configured to transmit a PDCCH within the PDCCH monitoring window.

In some possible embodiments of the present disclosure, the parameter includes at least one of the quantity of time domain units in the PDCCH monitoring window, or the quantity of MOs in the PDCCH monitoring window.

In some possible embodiments of the present disclosure, in the case that the parameter includes the quantity of MOs in the PDCCH monitoring window, the first transmission module 61 includes a first transmission unit configured to transmit the parameter through UE-specific RRC signaling.

In some possible embodiments of the present disclosure, in the case that the parameter includes the quantity of time domain units in the PDCCH monitoring window, the second determination module 62 includes a third determination unit configured to determine all search space monitoring time domain positions in the PDCCH monitoring window in accordance with a first association relationship between serial numbers of the time domain units where the MOs in a search space are located and the quantity of time domain units in the PDCCH monitoring window.

In some possible embodiments of the present disclosure, the first association relationship is expressed as mod (n, W)=i, where n represents the serial number of the time domain unit where the MO in the search space is located, W represents the quantity of time domain units in a PDCCH monitoring window i, i represents a quotient of n divided by W, i is an integer greater than or equal to 0, and serial numbers of the time domain units where MOs in the search space in the PDCCH monitoring window i are located satisfy the formula.

In some possible embodiments of the present disclosure, the quantity of time domain units in the PDCCH monitoring window is an integral multiple of a search space monitoring cycle.

In some possible embodiments of the present disclosure, the first transmission module 61 includes a second transmission unit configured to transmit the parameter through UE-specific RRC signaling.

In some possible embodiments of the present disclosure, in the case that the parameter includes the quantity of time domain units in the PDCCH monitoring window, the second determination module 62 includes a fourth determination unit configured to determine all time domain units in the PDCCH monitoring window in accordance with a second association relationship between serial numbers of the time domain units and the quantity of time domain units in the PDCCH monitoring window.

In some possible embodiments of the present disclosure, the second association relationship is expressed as mod (m, W)=j, where m represents the serial number of the time domain unit, W represents the quantity of time domain units in a PDCCH monitoring window j, j represents a quotient of m divided by W, j is an integer greater than or equal to 0, the time domain units in the PDCCH monitoring window j include all time domain units whose serial numbers satisfy the formula, and the time domain unit includes consecutive slots or consecutive OFDM symbols.

In some possible embodiments of the present disclosure, the first transmission module 61 includes a third transmission unit configured to transmit the parameter through UE-specific RRC signaling or cell-specific RRC signaling.

It should be appreciated that, the base station corresponds to the above-mentioned PDCCH transmission method for the base station, and the implementation of the base station may refer to that of the above-mentioned PDCCH transmission method with a same technical effect, which will not be particularly defined herein.

Figure 7:
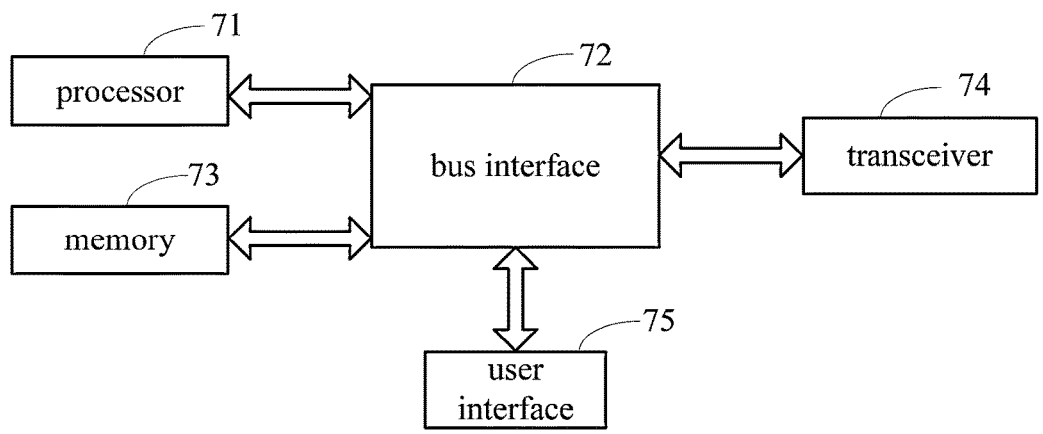
FIG. 7 is a schematic view showing the UE according to one embodiment of the present disclosure.

In order to achieve the above-mentioned object in a better manner, as shown in FIG. 7, the present disclosure further provides in some embodiments a UE, which includes a processor 71, and a memory 73 coupled to the processor 71 via a bus interface 72 and configured to store therein programs and data for the operation of the processor 71. The processor 71 is configured to call and execute the programs and data in the memory 73. A transceiver 74 is coupled to the processor via the bus interface 72, and configured to receive and transmit data under the control of the processor 71. To be specific, the processor 71 is configured to execute the program so as to: receive a relevant parameter of a PDCCH monitoring window; determine the PDCCH monitoring window in accordance with the parameter; and detect and receive a PDCCH within the PDCCH monitoring window.

In some possible embodiments of the present disclosure, the parameter includes at least one of the quantity of time domain units in the PDCCH monitoring window, or the quantity of MOs in the PDCCH monitoring window.

In some possible embodiments of the present disclosure, in the case that the parameter includes the quantity of MOs in the PDCCH monitoring window, the processor 71 is further configured to execute the computer program so as to receive the parameter through UE-specific RRC signaling.

In some possible embodiments of the present disclosure, in the case that the parameter includes the quantity of time domain units in the PDCCH monitoring window, the processor 71 is further configured to execute the computer program so as to determine all search space monitoring time domain positions in the PDCCH monitoring window in accordance with a first association relationship between serial numbers of the time domain units where the MOs in a search space are located and the quantity of time domain units in the PDCCH monitoring window.

In some possible embodiments of the present disclosure, the first association relationship is expressed as mod (n, W)=i, where n represents the serial number of the time domain unit where the MO in the search space is located, W represents the quantity of time domain units in a PDCCH monitoring window i, i represents a quotient of n divided by W, i is an integer greater than or equal to 0, and serial numbers of the time domain units where MOs in the search space in the PDCCH monitoring window i are located satisfy the formula.

In some possible embodiments of the present disclosure, the quantity of time domain units in the PDCCH monitoring window is an integral multiple of a search space monitoring cycle.

In some possible embodiments of the present disclosure, the processor 71 is further configured to execute the computer program so as to receive the parameter through UE-specific RRC signaling.

In some possible embodiments of the present disclosure, in the case that the parameter includes the quantity of time domain units in the PDCCH monitoring window, the processor 71 is further configured to execute the computer program so as to determine all time domain units in the PDCCH monitoring window in accordance with a second association relationship between serial numbers of the time domain units and the quantity of time domain units in the PDCCH monitoring window.

In some possible embodiments of the present disclosure, the second association relationship is expressed as mod (m, W)=j, where m represents the serial number of the time domain unit, W represents the quantity of time domain units in a PDCCH monitoring window j, j represents a quotient of m divided by W, j is an integer greater than or equal to 0, the time domain units in the PDCCH monitoring window j include all time domain units whose serial numbers satisfy the formula, and the time domain unit includes consecutive slots or consecutive OFDM symbols.

In some possible embodiments of the present disclosure, the processor 71 is further configured to execute the computer program so as to receive the parameter through UE-specific RRC signaling or cell-specific RRC signaling.

In some possible embodiments of the present disclosure, one search space has a same structure in each MO in the PDCCH monitoring window, or one search space is distributed in a plurality of MOs in the PDCCH monitoring window.

In some possible embodiments of the present disclosure, in the case that one search space has a same structure in each MO in the PDCCH monitoring window, the processor 71 is further configured to execute the computer program so as to stop the detection of the PDCCH in remaining MOs in the PDCCH monitoring window after a desired DCI format has been detected and received in any MO in the PDCCH monitoring window.

In some possible embodiments of the present disclosure, in the case that one search space is distributed in the plurality of MOs in the PDCCH monitoring window, the processor 71 is further configured to execute the computer program so as to stop the detection of the PDCCH on remaining candidate positions in the search space after the desired DCI format has been detected and received on any candidate position in the search space.

It should be appreciated that, the UE corresponds to the above-mentioned PDCCH detection method for the UE, and the implementation of the UE may refer to that of the above-mentioned PDCCH detection method with a same technical effect, which will not be particularly defined herein.

It should be appreciated that, in FIG. 7, bus architecture may include a number of buses and bridges connected to each other, so as to connect various circuits for one or more processors 71 and one or more memories 73. In addition, as is known in the art, the bus architecture may be used to connect any other circuits, such as a circuit for a peripheral device, a circuit for a voltage stabilizer and a power management circuit. The bus interface may be provided, and the transceiver 74 may consist of a plurality of elements, i.e., a transmitter and a receiver for communication with any other devices over a transmission medium. With respect to different UEs, a user interface 75 may also be provided for devices which are to be arranged inside or outside the UE, and these devices may include but not limited to a keypad, a display, a speaker, a microphone and a joystick. The processor 71 may take charge of managing the bus architecture as well as general processings. The memory 73 may store therein data for the operation of the processor 71.

It should be appreciated that, all of, or parts of, the steps may be implemented through hardware, or implemented through relevant hardware under the control of a computer program. The computer program may include instructions for executing parts of, or all of, the steps of the method, and it may be stored in a computer-readable storage medium, e.g., a volatile or non-volatile storage medium in any form.

Figure 8:
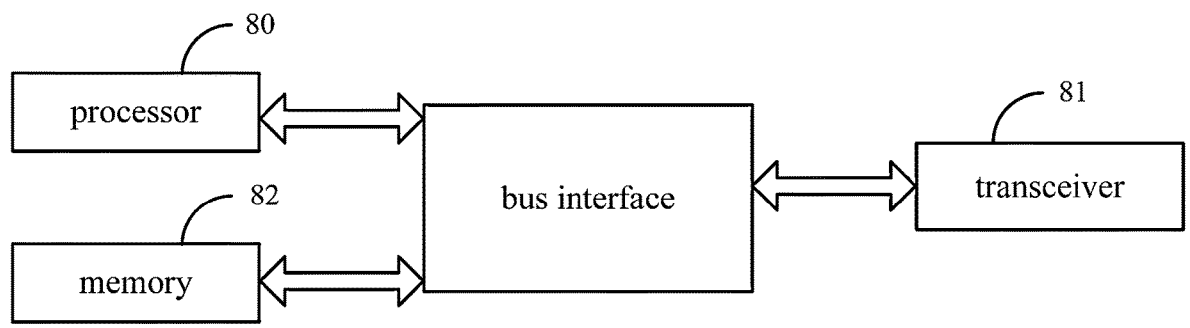
FIG. 8 is a schematic view showing the base station according to one embodiment of the present disclosure.

As shown in FIG. 8, the present disclosure further provides in some embodiments a base station, which includes a processor 80, and a memory 82 coupled to the processor 80 via a bus interface, and a transceiver 81 coupled to the processor 80 via the bus interface. The memory 82 is configured to store therein a computer program and data for the operation of the processor. The transceiver 81 is configured to transmit data information or pilot signals, and receive an uplink control channel. The processor 80 is configured to call and execute the computer program and data in the memory 82, so as to: transmit a relevant parameter of a PDCCH monitoring window; determine the PDCCH monitoring window in accordance with the parameter; and transmit a PDCCH within the PDCCH monitoring window. The transceiver 81 is configured to receive and transmit data under the control of the processor 80.

In some possible embodiments of the present disclosure, the parameter includes at least one of the quantity of time domain units in the PDCCH monitoring window, or the quantity of MOs in the PDCCH monitoring window.

In some possible embodiments of the present disclosure, in the case that the parameter includes the quantity of MOs in the PDCCH monitoring window, the processor 80 is further configured to execute the computer program so as to transmit the parameter through UE-specific RRC signaling.

In some possible embodiments of the present disclosure, in the case that the parameter includes the quantity of time domain units in the PDCCH monitoring window, the processor 80 is further configured to execute the computer program so as to determine all search space monitoring time domain positions in the PDCCH monitoring window in accordance with a first association relationship between serial numbers of the time domain units where the MOs in a search space are located and the quantity of time domain units in the PDCCH monitoring window.

In some possible embodiments of the present disclosure, the first association relationship is expressed as mod (n, W)=i, where n represents the serial number of the time domain unit where the MO in the search space is located, W represents the quantity of time domain units in a PDCCH monitoring window i, i represents a quotient of n divided by W, i is an integer greater than or equal to 0, and serial numbers of the time domain units where MOs in the search space in the PDCCH monitoring window i are located satisfy the formula.

In some possible embodiments of the present disclosure, the quantity of time domain units in the PDCCH monitoring window is an integral multiple of a search space monitoring cycle.

In some possible embodiments of the present disclosure, the processor is further configured to execute the computer program so as to transmit the parameter through UE-specific RRC signaling.

In some possible embodiments of the present disclosure, in the case that the parameter includes the quantity of time domain units in the PDCCH monitoring window, the processor 80 is further configured to execute the computer program so as to determine all time domain units in the PDCCH monitoring window in accordance with a second association relationship between serial numbers of the time domain units and the quantity of time domain units in the PDCCH monitoring window.

In some possible embodiments of the present disclosure, the second association relationship is expressed as mod (m, W)=j, where m represents the serial number of the time domain unit, W represents the quantity of time domain units in a PDCCH monitoring window j, j represents a quotient of m divided by W, j is an integer greater than or equal to 0, the time domain units in the PDCCH monitoring window j include all time domain units whose serial numbers satisfy the formula, and the time domain unit includes consecutive slots or consecutive OFDM symbols.

In some possible embodiments of the present disclosure, the processor 80 is further configured to execute the computer program so as to transmit the parameter through UE-specific RRC signaling or cell-specific RRC signaling.

It should be appreciated that, the base station corresponds to the above-mentioned PDCCH transmission method for the base station, and the implementation of the base station may refer to that of the above-mentioned PDCCH transmission method with a same technical effect, which will not be particularly defined herein.

In FIG. 8, bus architecture may include a number of buses and bridges connected to each other, so as to connect various circuits for one or more processors 80 and one or more memories 82. In addition, as is known in the art, the bus architecture may be used to connect any other circuits, such as a circuit for a peripheral device, a circuit for a voltage stabilizer and a power management circuit. The bus interface may be provided, and the transceiver 81 may consist of a plurality of elements, i.e., a transmitter and a receiver for communication with any other devices over a transmission medium. The processor 80 may take charge of managing the bus architecture as well as general processings. The memory 82 may store therein data for the operation of the processor 80.

The present disclosure further provides in some embodiments a computer-readable storage medium storing therein a computer program. The computer program is executed by a processor, so as to implement the above-mentioned PDCCH detection method or PDCCH transmission method with a same technical effect, which will not be particularly defined herein. The computer-readable storage medium may be, e.g., a read-only memory (Read-Only Memory, ROM), a random access memory (Random Access Memory, RAM), a magnetic disk or an optical disk.

It should be appreciated that, all of, or parts of, the steps may be implemented through hardware, or implemented through relevant hardware under the control of a computer program. The computer program may include instructions for executing parts of, or all of, the steps of the method, and it may be stored in a computer-readable storage medium, e.g., a storage medium in any form.

According to the embodiments of the present disclosure, through transmitting, to the first terminal, the first indication information indicating the resource position occupied by the high-priority service transmission of the second terminal in the reference resource domain and the second indication information indicating whether there is a resource conflict between the service transmission of the first terminal and the high-priority service transmission, the first terminal may stop the service transmission on the target resource position where the resource conflict occurs in accordance with the first indication information and the second indication information. As a result, it is able to prevent the interference caused by the low-priority service transmission on the high-priority service transmission.

In addition, it should be appreciated that, according to the device and the method in the embodiments of the present disclosure, the members and/or steps may be subdivided and/or recombined, which shall also be deemed as equivalents of the present disclosure. In addition, the steps for executing the above-mentioned processings may be performed in a chronological order. Of course, some steps may also be performed in parallel, or independently of each other. It should be further appreciated that, after reading the descriptions of the present disclosure, it is able for a person skilled in the art, using a basic programming skill, to implement any or all steps of the method and any or all members of the device in any computing device (including a processor and a storage medium) or a network consisting of the computing devices, in the form of hardware, firmware, software or a combination thereof.

Hence, the purposes of the present disclosure may also be implemented by one program or a set of programs running on any computing device, e.g., a known general-purpose computer, or implemented merely by a program product including programs codes capable of implementing the method or device. In other words, this program product and a storage medium storing therein the program product also constitute a part of the present disclosure. Obviously, the storage medium may be any known storage medium or a storage medium that may occur in future. It should be further appreciated that, according to the device and the method in the embodiments of the present disclosure, the members and/or steps may be subdivided and/or recombined, which shall also be deemed as equivalents of the present disclosure. In addition, the steps for executing the above-mentioned processings may be performed in a chronological order. Of course, some steps may also be performed in parallel, or independent of each other.

It should be further appreciated that, the above modules are divided merely on the basis of their logic functions, and in actual use, they may be completely or partially integrated into a physical entity, or physically separated from each other. These modules may be implemented by calling software through a processing element, or implemented in the form of hardware. For example, the determination module may be a processing element arranged separately, or integrated into a chip of the above-mentioned device. In addition, the determination module may be stored in the memory of the above-mentioned device in the form of a program code, and may be called and executed by a processing element of the above-mentioned device so as to achieve the above functions. The other modules may be implemented in a similar manner. All or parts of the modules may be integrated together or arranged separately. Here, the modules, units or assemblies may each of an Integrated Circuit (IC) having a signal processing capability. During the implementation, the steps of the method or the modules may be implemented through an integrated logic circuit of the processing element in the form of hardware or through instructions in the form of software.

For example, the above modules, units, sub-units or sub-modules may be one or more ICs capable of implementing the above-mentioned method, e.g., one or more Application Specific Integrated Circuits (ASICs), one or more Digital Signal Processors (DSPs), or one or more Field Programmable Gate Array (FPGA). For another example, when a certain module is implemented by calling a program code through a processing element, the processing element may be a general-purpose processor, e.g., a Central Processing Unit (CPU) or any other processor capable of calling the program code. These modules may be integrated together and implemented in the form of system-on-a-chip (SOC).

Such words as "first" and "second" involved in the specification and the appended claims are merely used to differentiate different objects rather than to represent any specific order. It should be appreciated that, the data used in this way may be replaced with each other, so as to implement the embodiments in an order other than that shown in the drawings or described in the specification. In addition, such terms as "include" or "including" or any other variations involved in the present disclosure intend to provide non-exclusive coverage, so that a procedure, method, system, product or device including a series of steps or units may also include any other elements not listed herein, or may include any inherent steps or units of the procedure, method, system, product or device. The expression "and/or" in the description and the appended claims is merely used to represent at least one of the objects before and after the expression. For example, "A and/or B and/or C" represents seven situations, i.e., there is only A, there is only B, there is only C, there are both A and B, there are both B and C, thereby are both A and C, and there are A, B and C. Similarly, the phrase "at least one of A or B" in the specification and the appended claims shall be understood as "there is only A, there is only B, or there are both A and B".

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A Physical Downlink Control Channel (PDCCH) detection method performed by a User Equipment (UE), the PDCCH detection method comprising:
receiving a relevant parameter of a PDCCH monitoring window, wherein the parameter comprises at least one of the quantity of time domain units in the PDCCH monitoring window, or the quantity of Monitoring Occasions (MOs) in the PDCCH monitoring window;
determining the PDCCH monitoring window in accordance with the parameter; and
detecting and receiving a PDCCH within the PDCCH monitoring window,
wherein in the case that the parameter comprises the quantity of time domain units in the PDCCH monitoring window, the determining the PDCCH monitoring window comprises determining all search space monitoring time domain positions in the PDCCH monitoring window in accordance with a first association relationship between serial numbers of the time domain units where the MOs in a search space are located and the quantity of time domain units in the PDCCH monitoring window; or wherein in the case that the parameter comprises the quantity of time domain units in the PDCCH monitoring window, the determining the PDCCH monitoring window comprises determining all time domain units in the PDCCH monitoring window in accordance with a second association relationship between serial numbers of the time domain units and the quantity of time domain units in the PDCCH monitoring window.

2. The PDCCH detection method according to claim 1, wherein in the case that the parameter comprises the quantity of MOs in the PDCCH monitoring window, the receiving the relevant parameter of the PDCCH monitoring window comprises receiving the parameter through UE-specific Radio Resource Control (RRC) signaling; or wherein in the case that the parameter comprises the quantity of time domain units in the PDCCH monitoring window, the receiving the relevant parameter of the PDCCH monitoring window comprises receiving the parameter through UE-specific RRC signaling; or wherein in the case that the parameter comprises the quantity of time domain units in the PDCCH monitoring window, the receiving the relevant parameter of the PDCCH monitoring window comprises receiving the parameter through UE-specific RRC signaling or cell-specific RRC signaling.

3. The PDCCH detection method according to claim 2, wherein the first association relationship is expressed as mod (n, W)=i, where n represents the serial number of the time domain unit where the MO in the search space is located, W represents the quantity of time domain units in a PDCCH monitoring window i, i represents a quotient of n divided by W, i is an integer greater than or equal to 0, and serial numbers of the time domain units where MOs in the search space in the PDCCH monitoring window i are located satisfy the formula, wherein the quantity of time domain units in the PDCCH monitoring window is an integral multiple of a search space monitoring cycle.

4. The PDCCH detection method according to claim 2, wherein the second association relationship is expressed as mod (m, W)=j, where m represents the serial number of the time domain unit, W represents the quantity of time domain units in a PDCCH monitoring window j, j represents a quotient of m divided by W, j is an integer greater than or equal to 0, the time domain units in the PDCCH monitoring window j comprise all time domain units whose serial numbers satisfy the formula, and the time domain unit comprises consecutive slots or consecutive Orthogonal Frequency Division Multiplexing (OFDM) symbols.

5. The PDCCH detection method according to claim 1, wherein one search space has a same structure in each MO in the PDCCH monitoring window, or one search space is distributed in a plurality of MOs in the PDCCH monitoring window.

6. The PDCCH detection method according to claim 5, wherein in the case that one search space has a same structure in each MO in the PDCCH monitoring window, the PDCCH detection method further comprises stopping the detection of the PDCCH in remaining MOs in the PDCCH monitoring window after a desired Downlink Control Information (DCI) format has been detected and received in any MO in the PDCCH monitoring window; or wherein in the case that one search space is distributed in the plurality of MOs in the PDCCH monitoring window, the PDCCH detection method further comprises stopping the detection of the PDCCH on remaining candidate positions in the search space after the desired DCI format has been detected and received on any candidate position in the search space.

7. A Physical Downlink Control Channel (PDCCH) transmission method performed by a base station, the PDCCH transmission method comprising:

transmitting a relevant parameter of a PDCCH monitoring window, wherein the parameter comprises at least one of the quantity of time domain units in the PDCCH monitoring window, or the quantity of Monitoring Occasions (MOs) in the PDCCH monitoring window;

determining the PDCCH monitoring window in accordance with the parameter; and transmitting a PDCCH within the PDCCH monitoring window, wherein in the case that the parameter comprises the quantity of time domain units in the PDCCH monitoring window, the determining the PDCCH monitoring window comprises determining all search space monitoring time domain positions in the PDCCH monitoring window in accordance with a first association relationship between serial numbers of the time domain units where the MOs in a search space are located and the quantity of time domain units in the PDCCH monitoring window; or wherein in the case that the parameter comprises the quantity of time domain units in the PDCCH monitoring window, the determining the PDCCH monitoring window comprises determining all time domain units in the PDCCH monitoring window in accordance with a second association relationship between serial numbers of the time domain units and the quantity of time domain units in the PDCCH monitoring window.

8. The PDCCH transmission method according to claim 7, wherein in the case that the parameter comprises the quantity of MOs in the PDCCH monitoring window, the transmitting the relevant parameter of the PDCCH monitoring window comprises transmitting the parameter through UE-specific Radio Resource Control (RRC) signaling; or wherein in the case that the parameter comprises the quantity of time domain units in the PDCCH monitoring window, the transmitting the relevant parameter of the PDCCH monitoring window comprises transmitting the parameter through UE-specific RRC signaling; or wherein in the case that the parameter comprises the quantity of time domain units in the PDCCH monitoring window, the transmitting the relevant parameter of the PDCCH monitoring window comprises transmitting the parameter through UE-specific RRC signaling or cell-specific RRC signaling.

9. The PDCCH transmission method according to claim 8, wherein the first association relationship is expressed as mod (n, W)=i, where n represents the serial number of the time domain unit where the MO in the search space is located, W represents the quantity of time domain units in a PDCCH monitoring window i, i represents a quotient of n divided by W, i is an integer greater than or equal to 0, and serial numbers of the time domain units where MOs in the search space in the PDCCH monitoring window i are located satisfy the formula, wherein the quantity of time domain units in the PDCCH monitoring window is an integral multiple of a search space monitoring cycle.

10. The PDCCH transmission method according to claim 8, wherein the second association relationship is expressed as mod (m, W)=j, where m represents the serial number of the time domain unit, W represents the quantity of time domain units in a PDCCH monitoring window j, j represents a quotient of m divided by W, j is an integer greater than or equal to 0, the time domain units in the PDCCH monitoring window j comprise all time domain units whose serial numbers satisfy the formula, and the time domain unit comprises consecutive slots or consecutive Orthogonal Frequency Division Multiplexing (OFDM) symbols.

11. A User Equipment (UE), comprising a transceiver, a memory, a processor, and a computer program stored in the memory and executed by the processor, wherein the processor is configured to execute the computer program so as to: receive a relevant parameter of a Physical Downlink Control Channel (PDCCH) monitoring window; determine the PDCCH monitoring window in accordance with the parameter; and detect and receive a PDCCH within the PDCCH monitoring window, wherein the parameter comprises at least one of the quantity of time domain units in the PDCCH monitoring window, or the quantity of Monitoring Occasions (MOs) in the PDCCH monitoring window, wherein in the case that the parameter comprises the quantity of time domain units in the PDCCH monitoring window, the processor is further configured to execute the computer program so as to determine all search space monitoring time domain positions in the PDCCH monitoring window in accordance with a first association relationship between serial numbers of the time domain units where the MOs in a search space are located and the quantity of time domain units in the PDCCH monitoring window; or wherein in the case that the parameter comprises the quantity of time domain units in the PDCCH monitoring window, the processor is further configured to execute the computer program so as to determine all time domain units in the PDCCH monitoring window in accordance with a second association relationship between serial numbers of the time domain units and the quantity of time domain units in the PDCCH monitoring window.

12. The UE according to claim 11, wherein in the case that the parameter comprises the quantity of MOs in the PDCCH monitoring window, the processor is further configured to execute the computer program so as to receive the parameter through UE-specific Radio Resource Control (RRC) signaling; or wherein in the case that the parameter comprises the quantity of time domain units in the PDCCH monitoring window, the processor is further configured to execute the computer program so as to receive the parameter through UE-specific RRC signaling; or wherein in the case that the parameter comprises the quantity of time domain units in the PDCCH monitoring window, the processor is further configured to execute the computer program so as to receive the parameter through UE-specific RRC signaling or cell-specific RRC signaling.

13. The UE according to claim 12, wherein the first association relationship is expressed as mod (n, W)=i, where n represents the serial number of the time domain unit where the MO in the search space is located, W represents the quantity of time domain units in a PDCCH monitoring window i, i represents a quotient of n divided by W, i is an integer greater than or equal to 0, and serial numbers of the time domain units where MOs in the search space in the PDCCH monitoring window i are located satisfy the formula, wherein the quantity of time domain units in the PDCCH monitoring window is an integral multiple of a search space monitoring cycle.

14. The UE according to claim 12, wherein the second association relationship is expressed as mod (m, W)=j, where m represents the serial number of the time domain unit, W represents the quantity of time domain units in a PDCCH monitoring window j, j represents a quotient of m divided by W, j is an integer greater than or equal to 0, the time domain units in the PDCCH monitoring window j comprise all time domain units whose serial numbers satisfy the formula, and the time domain unit comprises consecutive slots or consecutive Orthogonal Frequency Division Multiplexing (OFDM) symbols.

15. The UE according to claim 11, wherein one search space has a same structure in each MO in the PDCCH monitoring window, or one search space is distributed in a plurality of MOs in the PDCCH monitoring window.

16. The UE according to claim 15, wherein in the case that one search space has a same structure in each MO in the PDCCH monitoring window, the processor is further configured to execute the computer program so as to stop the detection of the PDCCH in remaining MOs in the PDCCH monitoring window after a desired Downlink Control Information (DCI) format has been detected and received in any MO in the PDCCH monitoring window; or wherein in the case that one search space is distributed in the plurality of MOs in the PDCCH monitoring window, the processor is further configured to execute the computer program so as to stop the detection of the PDCCH on remaining candidate positions in the search space after the desired DCI format has been detected and received on any candidate position in the search space.

17. A base station, comprising a transceiver, a memory, a processor, and a computer program stored in the memory and executed by the processor, wherein the processor is configured to execute the computer program so as to realize the PDCCH transmission method according to claim 7.

18. The base station according to claim 17, wherein in the case that the parameter comprises the quantity of MOs in the PDCCH monitoring window, the processor is further configured to execute the computer program so as to transmit the parameter through UE-specific Radio Resource Control (RRC) signaling; or wherein in the case that the parameter comprises the quantity of time domain units in the PDCCH monitoring window, the processor is further configured to execute the computer program so as to transmit the parameter through UE-specific RRC signaling; or wherein in the case that the parameter comprises the quantity of time domain units in the PDCCH monitoring window, the processor is further configured to execute the computer program so as to transmit the parameter through UE-specific RRC signaling or cell-specific RRC signaling.

19. The base station according to claim 18, wherein the first association relationship is expressed as mod (n, W)=i, where n represents the serial number of the time domain unit where the MO in the search space is located, W represents the quantity of time domain units in a PDCCH monitoring window i, i represents a quotient of n divided by W, i is an integer greater than or equal to 0, and serial numbers of the time domain units where MOs in the search space in the PDCCH monitoring window i are located satisfy the formula, wherein the quantity of time domain units in the PDCCH monitoring window is an integral multiple of a search space monitoring cycle.

20. The base station according to claim 18, wherein the second association relationship is expressed as mod (m, W)=j, where m represents the serial number of the time domain unit, W represents the quantity of time domain units in a PDCCH monitoring window j, j represents a quotient of m divided by W, j is an integer greater than or equal to 0, the time domain units in the PDCCH monitoring window j comprise all time domain units whose serial numbers satisfy the formula, and the time domain unit comprises consecutive slots or consecutive OFDM symbols.

* * * * *